US012809358B2

(12) United States Patent
Frikha et al.

(10) Patent No.: US 12,809,358 B2
(45) Date of Patent: Nov. 24, 2026

(54) MONITORING APPARATUS FOR QUALITY MONITORING WITH ADAPTIVE DATA VALUATION

(71) Applicant: Siemens Aktiengesellschaft, Munich (DE)

(72) Inventors: Ahmed Frikha, Munich (DE); Denis Krompaß, Vaterstetten (DE); Hans-Georg Köpken, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 497 days.

(21) Appl. No.: 18/280,991

(22) PCT Filed: Mar. 3, 2022

(86) PCT No.: PCT/EP2022/055365

§ 371 (c)(1),
(2) Date: Sep. 8, 2023

(87) PCT Pub. No.: WO2022/194561

PCT Pub. Date: Sep. 22, 2022

(65) Prior Publication Data

US 2024/0160195 A1 May 16, 2024

(30) Foreign Application Priority Data

Mar. 17, 2021 (EP) .................................... 21163106

(51) Int. Cl.
*G05B 19/418* (2006.01)

(52) U.S. Cl.
CPC . *G05B 19/41875* (2013.01); *G05B 19/41885* (2013.01)

(58) Field of Classification Search
CPC .................... G05B 19/41875; G05B 19/41835
See application file for complete search history.

(56) References Cited

U.S. PATENT DOCUMENTS 11,139,064 B1 * 10/2021 Neumann .............. G16H 20/60
11,188,068 B2 * 11/2021 Borowski .......... G05B 23/0232
(Continued)

FOREIGN PATENT DOCUMENTS

| | | | |
|---|---|---|---|
| CN | 111650891 | A | 9/2020 |
| EP | 3705962 | A1 | 9/2020 |
| WO | 2020193510 | A1 | 10/2020 |

OTHER PUBLICATIONS

International Search Report & Written Opinion for PCT/EP2022/055365 mailed on Jul. 11, 2022.
(Continued)

*Primary Examiner* — Elias Desta
(74) *Attorney, Agent, or Firm* — Schmeiser Olsen LLP

(57) ABSTRACT

A monitoring apparatus for an industrial manufacturing scenario is provided, including a) providing an initial version of a prediction unit, b) obtaining a set of unlabeled input data samples, c) aggregating an embedding indicator, d) aggregating a value indicator for each data sample of the set of unlabeled input data samples, e) selecting a subset of data samples of the set of unlabeled input data samples depending on the value indicator and outputting a labelling request to a labelling unit, f) receiving labels for the subset of data samples in the labelling unit, g) training the current version of the prediction unit resulting in a trained version of the prediction unit, and h) outputting a monitoring result for the set of unlabeled input data samples (Ds) by the trained version of the prediction unit indicating the quality of the supplemented manufacturing to control the manufacturing process.

13 Claims, 2 Drawing Sheets

(56) References Cited

U.S. PATENT DOCUMENTS

Figure 1:
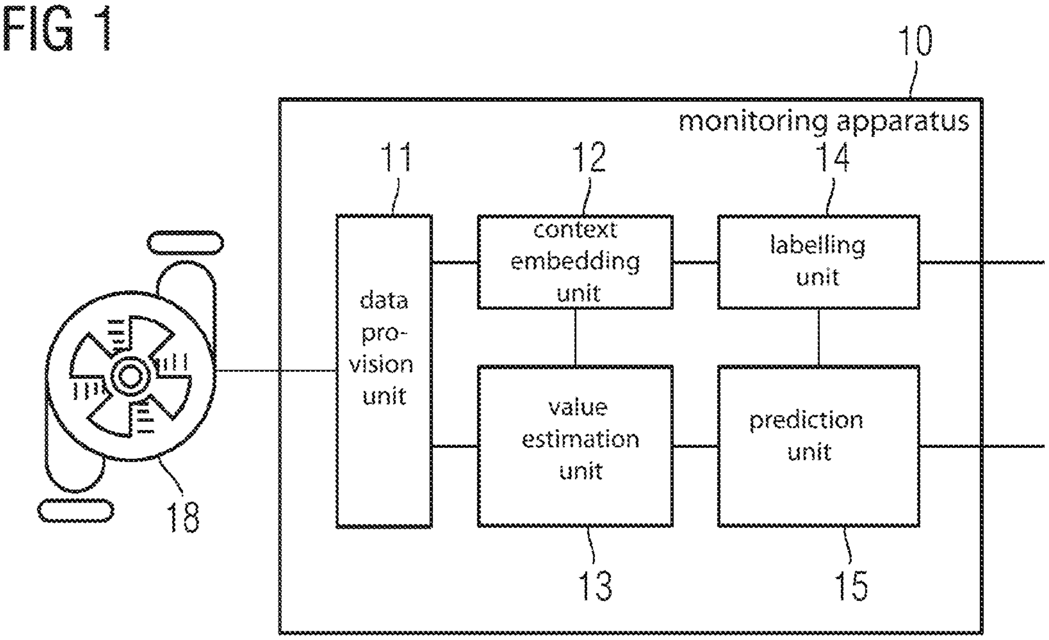

| | | | | |
|---|---|---|---|---|
| 2011/0040711 | A1 | 2/2011 | Yan et al. | |
| 2016/0159925 | A1 | 6/2016 | Morimoto et al. | |
| 2019/0354096 | A1* | 11/2019 | Pal | G05B 23/0278 |

OTHER PUBLICATIONS

Kunkun Pang et al: "Meta-Learning Transferable Active Learning Policies by Deep Reinforcement Learning", Arxiv.org, Cornell University Library, 201 Olin Library Cornell University Ithaca, NY 14853, Jun. 13, 2018.

Schmitt Jacqueline et al: "Predictive model-based quality inspection using Machine Learning and Edge Cloud Computing", Advanced Engineering Informatics, Elsevier, Amsterdam, NL, vol. 45.

Jinsung Yoon et al: "Data Valuation using Reinforcement Learning", Arxiv.org, Cornell University Library, 201 Olin Library Cornell University Ithaca, NY 14853.

Philip Bachman et al: "Learning Algorithms for Active Learning", Arxiv.org, Cornell University Library, 201 Olin Library Cornell University Ithaca, NY 14853.

Frye Maik et al: "Quality Improvement of Milling Processes Using Machine Learning-Algorithms", Sep. 3, 2019 (Sep. 3, 2019), pp. 1-6, XP055838750, Retrieved from the Internet: URL:https://www.imeko.org/publications/tc10-2019/IMEKO-TC10-2019-022.pdf.

Yoo Donggeun et al: "Learning Loss for Active Learning", 2019 IEEE/CVF Conference on Computer Vision and Pattern Recognition (CVPR), IEEE.

Li Dawei et al:"Deep hole boring tools condition monitoring based on LSTM network", DOI: 10. 16731 /j. cnki. 1671-3133. 2020. 08. 015, Modern Manufacturing Engineering, vol. 8, Aug. 18. 2020.

* cited by examiner

MONITORING APPARATUS FOR QUALITY MONITORING WITH ADAPTIVE DATA VALUATION

CROSS-REFERENCE TO RELATED APPLICATIONS

This application claims priority to PCT Application No. PCT/EP2022/055365, having a filing date of Mar. 3, 2022, which claims priority to EP Application No. 21163106.4, having a filing date of Mar. 17, 2021, the entire contents all of which are hereby incorporated by reference.

FIELD OF TECHNOLOGY

The following relates to an assistance apparatus and a method for adaptive data valuation.

BACKGROUND

Nowadays, in industrial manufacturing operation monitoring and quality monitoring are performed by data-driven applications, like anomaly detection or classification of quality, based on machine learning models. There exists a high diversity of manufacturing scenarios, e.g., different machine types, numerical programs (NC), manufacturing processes and production sites to name a few. Furthermore, the product portfolio of most manufacturers is constantly changing, and so is the recorded data during the product manufacturing. This creates a so called cold-start situation, i.e., each time a new manufacturing scenario, e.g., new machine, product or manufacturing process, is encountered, all data driven applications that are related to this scenario have to be developed from scratch.

The cold-start problem faced when developing data-driven applications for specific manufacturing scenario is not solved in industry. The applications are developed beginning by a usually time- and cost-intensive collection of big amounts of data. Subsequently, the whole collected dataset or random samples from it is annotated by usually scarce and costly domain experts. Finally, a machine learning model is trained with the annotated data. If the desired performance is not reached, more data has to be collected and randomly chosen samples have to be annotated. All the datapoints or randomly chosen subsets, even duplicates and non-useful data examples, are labeled due to the absence a method that assigns value to unlabeled datapoints.

To avoid this tedious process of developing data-driven applications, some problems are addressed with less accurate methods. For example, in the context of anomaly detection in industrial manufacturing, the quality monitoring is mostly performed by humans, either machinists or domain experts. However, due to the high number of produced products/workpieces assessing the quality of all of them is impossible. Hence, only randomly chosen batches are controlled, which does not guarantee a high coverage of the quality inspection.

EP 3705962 A1 discloses a method that leverages labeled data from different manufacturing situations to develop a machine learning model, e.g., for anomaly detection or for other classification applications, that can quickly adapt to newly encountered tasks. Data recorded while performing other previous manufacturing processes are used to train a highly adaptive model. So, if labeled data from several manufacturing scenarios are available, a model can be trained that is highly adaptable to a variety of unseen manufacturing scenarios. This would relax the cold-start situation as only few data samples are required from the new unseen manufacturing scenario and, hence, accelerate the development of data-driven applications for the new unseen, i.e., supplemented manufacturing scenario.

These methods, i.e., learning with few data samples, have two drawbacks. First, in most cases only few labeled data are available, which are sampled randomly. The few data samples of a new unseen manufacturing scenario used to customize the adaptive learning model or even more used to customize an untrained learning model lead to a moderate performance of the model. Second, after having customized the model to the new task, the learning model does not improve anymore since it is not further trained. For example, the performance of a classifying learning model would drop massively if a distribution of the data recorded during manufacturing would change, e.g., due to tooling overuse.

The article of KUNKUN PANG ET AL: "Meta-Learning Transferable Active Learning Policies by Deep Reinforcement Learning", ARXIV.org, CORNELL UNIVERSITY LIBRARY, 201 OLIN LIBRARY CORNELL UNIVERSITY ITHACA, NY14853, 13 Jun. 2018 (2018 Jun. 13), XP080890046 discloses modelling an active learning algorithm as a deep neural network that inputs a base learner state and an unlabeled point set and predicts the best point to annotate next. Training this active query policy network with reinforcement learning, produces a non-myopic policy for a given dataset. A multi-task dataset-embedding approach is described that allows dataset-agnostic active learners to be trained.

SUMMARY

An aspect relates to a monitoring apparatus and method that enables a faster customizing of a learning model to a new unseen manufacturing process providing higher performance, and which can continuously be improved.

A first aspect concerns a monitoring apparatus for quality monitoring of a manufacturing process supplemented to a set of predefined manufacturing processes of industrial manufacturing scenario, comprising at least one processor configured to perform:

a) providing an initial version of a prediction unit,
b) obtaining a set of unlabeled input data samples recorded at the supplemented manufacturing process,
c) aggregating an embedding indicator indicating an association between the data samples of the supplemented manufacturing process by feeding the set of unlabeled input data samples into a context embedding unit,
d) aggregating a value indicator for each data sample of the set of unlabeled input data samples by feeding the embedding indicator and the set of unlabeled input data samples into a value estimation unit,
e) selecting a subset of data samples of the set of unlabeled input data samples depending on the value indicator and outputting a labelling request to a labelling unit,
f) receiving labels for the subset of data samples in the labelling unit,
g) training the current version of the prediction unit based on the labelled subset resulting in a trained version of the prediction unit, and
h) outputting a monitoring result for the set of unlabeled input data samples by the trained version of the prediction unit indicating the quality of the supplemented manufacturing to control the manufacturing process.

The monitoring apparatus provides a valuation of the unlabeled data samples and concludes thereof a selection of data samples which are most likely relevant for the supplemented manufacturing process. The valuation is performed by the context embedding unit and the value estimation unit which assigns a value to each unlabeled data sample that is recorded during the supplemented manufacturing process. If the data sample is predicted to be valuable, e.g., is very different from the data samples usually recorded, it is saved and shown to the domain experts for labelling. The resulting labeled data samples are then used to further train the prediction unit for that manufacturing process. This pre-selection of valuable data samples from a large amount of unlabeled data samples reduces the effort of labelling and leads to a high performance of the trained version of the prediction unit in short time.

Labeling or labeled data is used as synonym for annotating or annotated data in this description. Data samples are sensor data recorded over time by sensors measuring physical parameters, e.g., torque, rotation speed, or image data from the work piece captured by a camera during the manufacturing process.

In an embodiment the monitoring apparatus is configured to adapt the value estimation unit based on a validation loss indicator calculated by the trained version of the prediction unit when processed with at least one labeled validation data sample validation loss indicator as input.

This enables a continuous improvement of the value estimation unit. The validation loss indicator can be used by the value estimator to determine how trained the prediction model is. This is based on the intuition that, there are probably data samples that are more useful at the beginning of training and others that are more valuable towards the end.

In an embodiment the monitoring apparatus is configured to adapt the context embedding unit based on the loss indicator and the adapted value estimation unit.

This enables a continuous improvement of the context embedding unit.

In an embodiment the monitoring apparatus is configured such that the context embedding unit and/or the value estimation unit are pre-trained based on at least one set of unlabeled training data samples of each of the predefined manufacturing processes.

This pre-trained context embedding unit and/or the value estimation unit constitutes a task-agnostic data valuation model. More precisely, the pre-trained context embedding unit and/or the value estimation unit leverages labeled data from previously seen, i.e., predefined manufacturing scenarios to yield an active learning system that can generalize to unseen supplemented manufacturing processes, i.e., estimate the value of their data unlabeled examples.

In a further embodiment the monitoring apparatus is configured such that the pre-trained context embedding unit and/or the pre-trained value estimation unit are trained before applying to the supplemented manufacturing process by

- generating one value estimation unit and one context embedding unit,
- for each of the predefined manufacturing processes, iteratively i) training a prediction unit for each of the predefined manufacturing processes based on a set of unlabeled input data samples of the predefined manufacturing process according to steps a) to g) of claim 1, ii) optimizing the value estimation unit and the context embedding unit depending on a difference indicator based on a difference between a validation loss indicator determined by the current version of the prediction unit when processed with at least one validation data sample of the predetermined manufacturing process as input and a moving average of validation losses of previous versions of the prediction unit.

The resulting optimized pre-trained value estimation unit and context embedding unit represent a task-agnostic data valuation model that leverages data samples from previously seen, i.e., predefined manufacturing scenarios to yield an active learning system that can generalize to unseen, supplemented manufacturing scenarios, i.e., estimate the value of their unlabeled data samples.

In an embodiment the monitoring apparatus is configured such that the context embedding unit, the value estimation unit and prediction unit are configured as a learning model.

Machine learning involves computers learning from data provided so that they carry out certain tasks. Machine learning algorithms build a learning model based on collected data samples, known as “training data”, in order to make predictions or decisions without being explicitly programmed to do so. The learning models can be structures as artificial neural network or in short neural network. Here each of the context embedding unit, the value estimation unit and the prediction units are separate learning models optimized or trained by data samples either from the predefined or the supplemented manufacturing process.

In a further embodiment the monitoring apparatus is configured such that the context embedding unit is configured as a recurrent neural network aggregating the information of all the data samples in the set into a vector that encodes the manufacturing process.

A recurrent neural network is a class of artificial neural networks where connections between nodes form a directed graph along a temporal sequence. This allows it to exhibit temporal dynamic behaviour. It shows best performance identifying an association between all data sample of the manufacturing processes.

In a further embodiment the monitoring apparatus is configured such optimizing of the value estimation unit and the context embedding unit is performed by stochastic gradient descent rule.

According to a further embodiment the monitoring apparatus is configured such that the initial version of a prediction unit is a randomly initialized prediction unit or a pre-trained prediction unit.

Using randomly initialized prediction units provides no or low requirements with respect to training data samples but requires more iterations to provide high performance in the monitoring result compared to the pre-trained prediction unit.

According to a further embodiment the monitoring apparatus is configured such the labelling unit comprises a user interface to receive labels from a human user and/or comprises a machine-machine-interface to receive labels from a labelling machine.

This allows domain experts or operation personnel of the manufacturing process to input labels for the requested data samples. Further on, labels can be input by a labelling machine providing labels semi or fully automatically. The monitoring apparatus can be configured to support both, human based and machine-based label input.

According to a further embodiment the monitoring apparatus is configured such the manufacturing processes are milling processes and the data of the supplemented manufacturing process are sensor data representing the milling process, especially a torques of the various axes in a milling machine, control deviations of the torque, or image data of the milled workpiece.

A second aspect concerns a method for quality monitoring of a supplemented manufacturing process to a set of predefined manufacturing processes of industrial manufacturing scenario, comprising:

a) providing an initial version of a prediction unit, b) obtaining a set of unlabeled input data samples recorded at the supplemented manufacturing process, c) aggregating an embedding indicator indicating an association between the data samples of the supplemented manufacturing process by feeding the set of unlabeled input data samples into a context embedding unit, d) aggregating a value indicator for each data sample of the set of unlabeled input data samples by feeding the embedding indicator and the set of unlabeled input data samples (Ds) into a value estimation unit, e) selecting a subset of data samples of the set of unlabeled input data samples depending on the value indicator and outputting a labelling request to a labelling unit, f) receiving labels for the subset of data samples in the labelling unit, g) training the current version of the prediction unit based on the labeled subset resulting in a trained version of the prediction unit, and h) outputting a monitoring result for the set of unlabeled input data samples by the trained version of the prediction unit indicating the quality of the supplemented manufacturing to control the manufacturing process.

The expression "a set of" input data samples is to be understood as high number of data samples, at least more than one sample. In an embodiment, the method assigns a value to each unlabeled data sample that is recorded during manufacturing. If a data sample is predicted to be valuable, e.g., is very different from the data samples usually recorded, it is saved and forwarded e.g., to the domain experts for labelling. The labeled samples are then used to train the prediction model for that manufacturing scenario.

A third aspect concerns a computer program product (non-transitory computer readable storage medium having instructions, which when executed by a processor, perform actions) directly loadable into the internal memory of a digital computer, comprising software code portions for performing the steps as described before, when said product is run on said digital computer.

BRIEF DESCRIPTION

Figure 2:
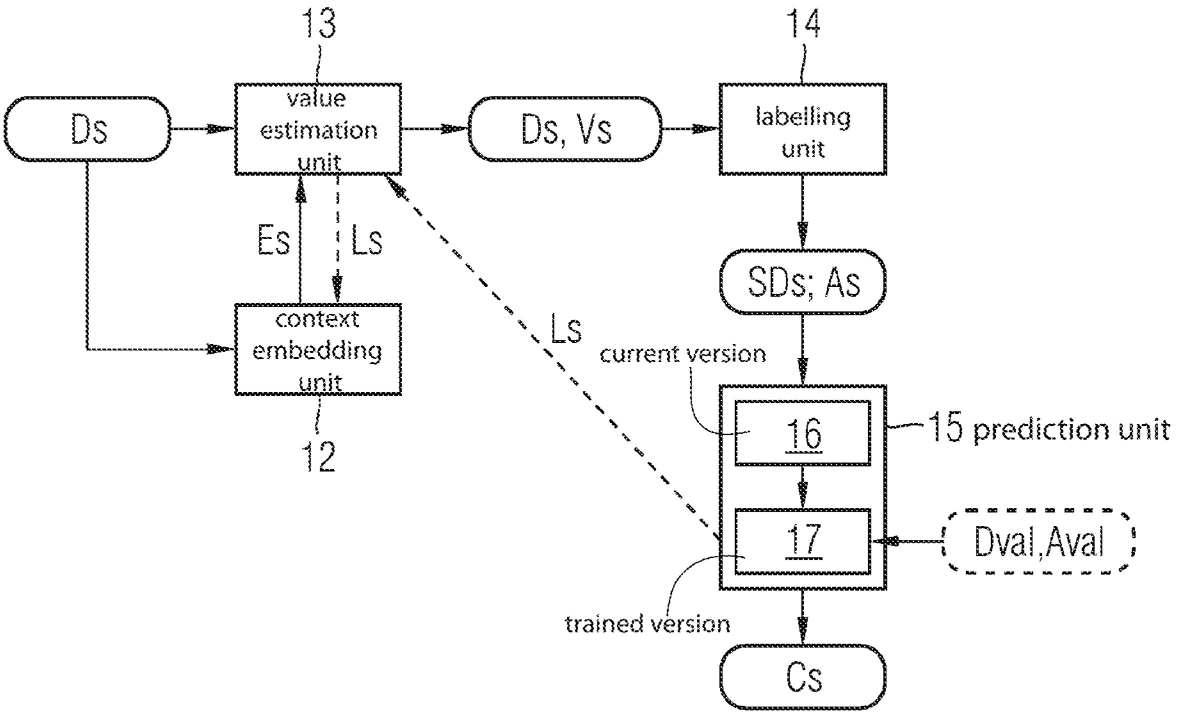
Figure 3:
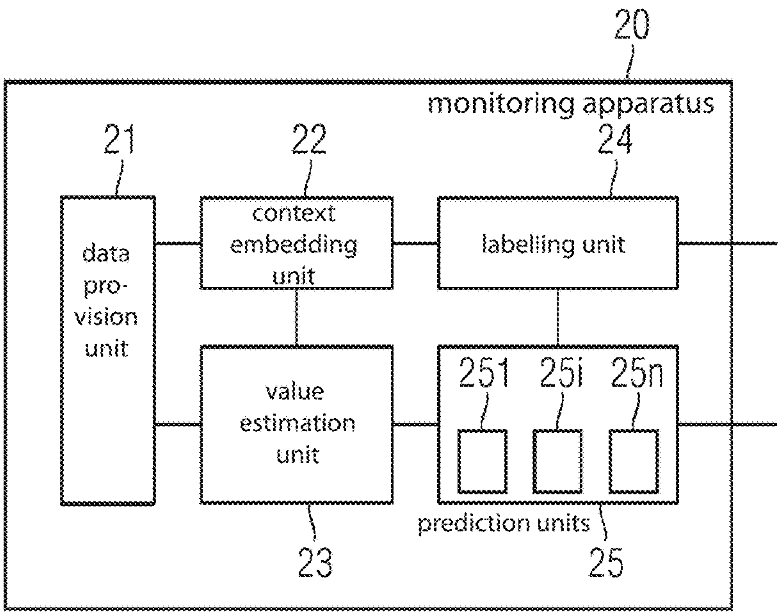
Figure 4:
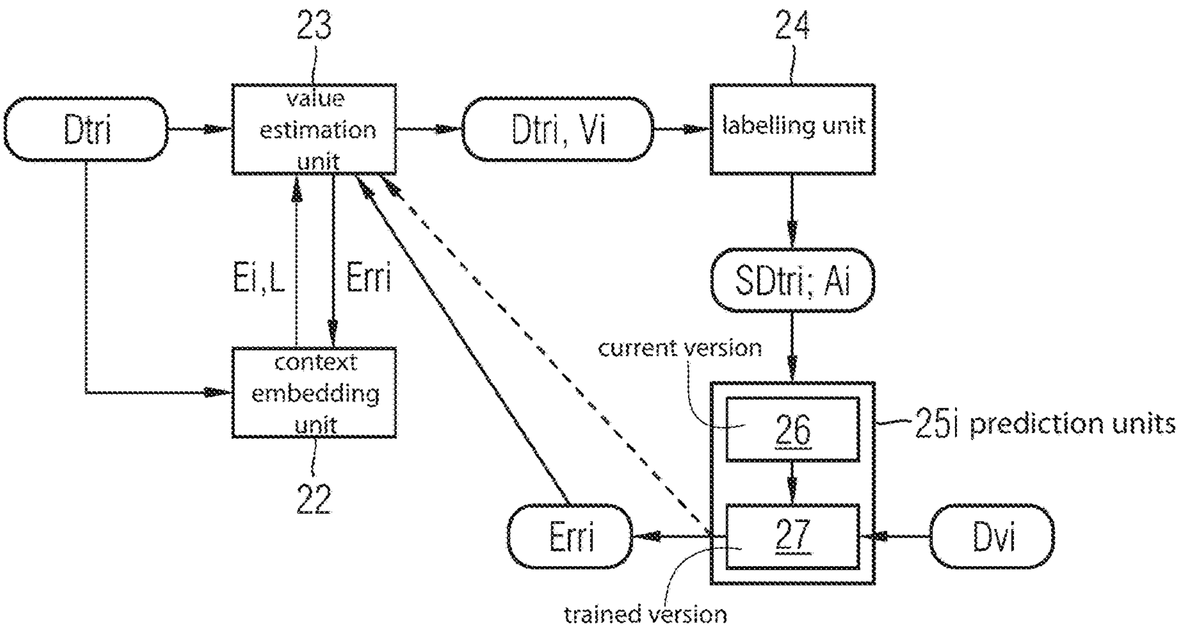

Some of the embodiments will be described in detail, with reference to the following figures, wherein like designations denote like members, wherein:

FIG. 1 schematically illustrates an embodiment of the inventive monitoring apparatus configured to monitor a manufacturing process:

FIG. 2 shows an embodiment of the inventive method illustrated by a schematic information flow diagram:

FIG. 3 schematically illustrates an embodiment of the inventive monitoring apparatus configured to train a context embedding unit and a value estimation unit: and FIG. 4 shows an embodiment of the inventive method for training a context embedding model and a value estimation model illustrated by a flow diagram.

DETAILED DESCRIPTION

It is noted that in the following detailed description of embodiments, the accompanying drawings are only schematic, and the illustrated elements are not necessarily shown to scale. Rather, the drawings are intended to illustrate functions and the co-operation of components. Here, it is to be understood that any connection or coupling of functional blocks, devices, components or other physical or functional elements could also be implemented by an indirect connection or coupling, e.g., via one or more intermediate elements. A connection or a coupling of elements or components or nodes can for example be implemented by a wire-based, a wireless connection and/or a combination of a wire-based and a wireless connection. Functional units can be implemented by dedicated hardware, e.g., processor, firmware or by software, and/or by a combination of dedicated hardware and firmware and software. It is further noted that each functional unit described for an apparatus can perform a functional step of the related method.

FIG. 1 shows a monitoring apparatus 10 consisting of one or several processors. The monitoring apparatus 10 is structured into functional units performing a quality monitoring.

Quality monitoring addresses an anomaly detection of a monitored manufacturing process or a classification solution in general regarding the quality of a monitored manufactured product. The anomaly detection or classification solution is provided by inputting data samples into a unit configured as learning model which is specifically trained for the monitored process in industrial manufacturing, e.g., in an automation plant.

The monitoring apparatus 10 comprises one or several processors configured as a data provision unit 11, a context embedding unit 12, a value estimation unit 13, a labelling unit 14 and a prediction unit 15. The data provision unit 11 obtains a set of unlabeled input data samples recorded at the supplemented manufacturing process executed by a manufacturing device 18. The value estimation unit 13, a labelling unit 14 and a prediction unit 15 are configured to provide a machine learning model, e.g., by an artificial neural network. The value estimation unit 13 is configured as learning model, e.g., a neural network structured as a multi-layer perceptron. The context embedding unit 12 is configured as learning model, as a recurrent neural network, e.g., structured as a long short-term memory.

The labelling unit 14 is configured to receive unlabeled input data samples and to select a subset of data samples out of the set of unlabeled input data samples. It is further configured to output a signal requesting a label associated to each data sample of the subset of data samples being input by a human or a machine. The labelling unit 14 comprises a user interface to receive labels from a human user and/or comprises a machine-machine-interface to receive labels from a labelling machine.

In industrial manufacturing, input data samples of a supplemented manufacturing process are usually recorded using a reasonable set of sensors, including cameras, which measures for example the torques of the various axes in a milling machine, control deviations of the torque, or image data of the milled workpiece.

In an embodiment, the method steps performed by the monitoring apparatus 10 are described in more detail by the schematic information flow diagram of FIG. 2. In the following description, the term task refers to a manufacturing process and is used as a synonym.

A set of unlabeled input data samples Ds and a set of labeled validation data samples Dval recorded at the supplemented manufacturing process are obtained for each supplemented manufacturing process by the data provision unit 11. As a first step an initial version of a prediction unit 15 is generated. The initial version of a prediction unit 15 can be a randomly initialized learning model, i.e., parameters of the prediction learning model are initialized with random numbers. Optionally, the initial version of a prediction unit 15 can be pre-trained, e.g., by data samples of the predefined manufacturing processes. A loss indicator L of the initial version of the prediction unit 15 is calculated based on the validation data samples Dval.

An embedding indicator Es indicating an association between the data samples of the supplemented manufacturing process is aggregated by feeding the set of unlabeled input data samples Ds into a context embedding unit 12. The context embedding unit 12 aggregates the information of all the data samples in the set into a vector that encodes the manufacturing process.

The same set of unlabeled input data samples Ds, the loss indicator L and the embedding indicator Es is input into the value estimation unit 13. The value estimation unit 13 aggregates a value indicator Vs for each data sample of the set of unlabeled input data samples Ds.

The labelling unit 14 selects a subset SDs of data samples of the set of unlabeled input data samples Ds depending on the value indicator Vs and outputs a labelling request. On receipt of labels As for the subset SDs of data samples Ds, the labelling unit 14 forwards the labelled subset of input data samples SDs, As to the prediction unit 15. A current version 16, here the initial version, of the prediction unit 15 is trained based on the labelled subset SDs, in several iterations resulting in a trained version of the prediction unit 17. The trained version of the prediction unit 17 outputs a monitoring result Cs indicating the quality of the supplemented manufacturing to control the manufacturing process for the set of unlabeled input data samples Ds.

The context embedding unit 12 and the adapted value estimation unit 13 can be further adapted and optimized based on the loss indicator Ls. This leads to an improvement of each of the context embedding unit 12, the valuation estimation unit 13 and the prediction unit 15 with each obtained and processed set of input data samples.

The steps of the monitoring method using provided in pseudo code are as follows:

1. Randomly initialize the prediction model.
2. Compute validation loss $L_S$ on the validation set
3. Initialize the value estimator and context embedder models, e.g., with the parameters found during training
4. For each batch of live data examples $D_S$ recorded during manufacturing do:
5. Preprocess $D_S$ from the new process $P_s$.
6. Feed $D_S$ to the context embedder to get a process embedding $E_S$
7. Feed $D_S$ and $E_S$ and the validation loss $L_S$ to the value estimator to get a value estimation for each data example
8. Sample M data examples out of the batch using the estimated values as sampling probabilities
9. Label the selected data examples
10. Train the classifier for a few iterations with the labeled data Examples
11. Compute validation loss $L_S$ on a validation set In an embodiment, the context embedding unit 12 and/or the value estimation unit 13 are pre-trained based on unlabeled input data samples of a set of predefined manufacturing processes. Pre-trained means, that the context embedding unit 12 and/or the value estimation unit 13 are trained before the set of data samples Ds of the supplemented manufacturing process are processed in the monitoring apparatus 10.

The data samples Ds have to be annotated and pre-processed with the same pre-processing steps applied to the data samples used to train the value estimation unit 13 and context embedding unit 12.

FIG. 3 shows a monitoring apparatus 20 comprising a data provision unit 21, a context embedding unit 22, value estimation unit 23, a labelling unit 24 and a prediction unit 25. A learning model of the value estimation unit 23 is trained together with another learning model of the context embedding unit 22, and n further learning models of prediction units 251, . . . , 25*n* for each of n predefined manufacturing processes comprised in the prediction unit 25.

Throughout this description the wording "training a unit" means "training the learning model of the respective unit".

The data value estimation unit 23 and the context embedding unit 22 are trained jointly with an iterative optimization procedure. The training is based on a set of data samples Di for each of n predefined manufacturing processes Pi.

FIG. 4 illustrates the steps conducted in each training iteration for one of the n predefined manufacturing processes Pi. The set of the data samples Di recorded at the predefined manufacturing process Pi comprise a set of unlabeled input data samples Dtri and set of labelled validation data samples Dvi. An initial version of the prediction unit 25*i* is generated for each predefined manufacturing process Pi.

For each predefined manufacturing process Pi, a set of unlabeled input data samples Dtri is obtained and fed into the context embedding unit 22. The context embedding unit 22 is configured, e.g., to be a recurrent neural network in order to aggregate the information of all the data samples Dtri in the set into an embedding indicator Ei, which is a vector that encodes the manufacturing process Pi. The value estimation unit 23 gets the same set of input data samples Dtri as input, along with the embedding indicator Ei from the context embedding unit 22 and a loss indicator L of the current version of the prediction unit 26 generated based on the set of validation data samples Dvi. The loss indicator L can be used by the value estimation unit 23 to determine how trained the prediction unit 23 is. This is based on the intuition that, there are probably data samples that are more useful at the beginning of training and others that are more valuable towards the end.

The value estimation unit 23 outputs a value indicator Vi for each of the unlabeled data samples in the set, which are then used as sampling probabilities to select a subset SDtri of data samples to be labelled. The subset SDtri of data samples comprises usually less data samples then the set of input data samples Dtri. The selected data samples are then labelled SDtri,Ai and used to train the current version of the prediction unit 26 with respect to a resulting classifier of the considered manufacturing process for a few iterations resulting in a trained version of the prediction unit 27. The labelling is performed as described for the processing a supplemented manufacturing process, see FIG. 2. The resulting classifier complies to the monitoring result Cs in the monitoring case processing data samples of the supplemented manufacturing process.

The finetuned trained version of the prediction unit 27 is then evaluated on the set of validation data samples Dvi. A difference indicator Erri, which is a difference between the resulting validation loss Li and a moving average of previous validation losses Li,ma, is used as an optimization objective, i.e., the current validation loss Li should be lower that the moving average Li,ma. Computed loss gradients, i.e., a gradient of the loss Li with respect to some parameters, e.g., parameters of the data valuation unit 23, are backpropagated to the context embedding unit 22 through the value estimation unit 23 and the finetuning updates of the classifier, i.e., the trained version of the prediction unit 27.

This is done for each predefined manufacturing sample used in the current iteration and average loss gradients are used to update the parameters of the value estimation unit 23 and context embedding unit 22.

By training the value estimation unit 23 and context embedding unit 22 on different tasks, i.e., manufacturing processes they progress towards getting task-agnostic, i.e., they learn patterns that are applicable to several, also unseen tasks from that task distribution (in our case, new but similar manufacturing machines, processes or products.

An example for an implementation of the pre-training of the value estimation unit 23 and context embedding unit 22 is illustrated in pseudocode below.

```
1. Require c different training processes P_i
2. Randomly initialize c different classifiers, one for each process
3. Randomly initialize the value estimator parameters θ
4. Randomly initialize the context embedder parameters ω
5. while not converged
6.   sample a batch of training processes
7.   for each sampled process P_i do:
8.     Randomly sample N unlabeled data examples D_tr,i from the
       training set of P_i
9.     Feed D_tr,i to the context embedder to get a process embedding E_i
10.    Feed D_tr,i and E_i and the validation loss for that process from the
       previous iteration to the value estimator to get a value
       estimation for each data example
11.    Sample M data examples out of the batch using the estimated
       values as sampling probabilities
12.    Label the selected data examples
13.    Train the classifier of the current process for a few iterations
       with the labeled data examples
14.    Compute the validation loss L_i of the trained classifier on the
       validation set of the current process
15.    Compute the error Err_i = L_i − L_i,ma
16.    Update the moving average of the validation losses of the
       current process L_i,ma
17.  Update the parameters of the value estimator and the context
     embedder to minimize the average of the errors Err_i computed for
     the sampled processes using a stochastic gradient descent rule
18. end while
```

In contrast to approaches, where few and randomly sampled data samples are used to adapt an adaptive learning model, the current approach trains a model, i.e., the monitoring apparatus, that selects the most useful data samples to train a prediction model to the new task (e.g., new manufacturing scenario). This provides a performance advantage of the initial classifier, i.e., the monitoring result at the beginning of manufacturing.

In an embodiment, the method proposed identifies interesting data examples, e.g., less frequent occurring data samples or borderline data samples, when they are recorded and asks to label them. These are then used to further train the prediction model. This provides a performance advantage during manufacturing.

It is to be understood that the above description of examples is intended to be illustrative and that the illustrated components are susceptible to various modifications. For example, the illustrated concepts could be applied for different technical systems and especially for different subtypes of the respective technical system with only minor adaptions.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A monitoring apparatus for quality monitoring of a manufacturing process, subsequently called supplemented manufacturing process, supplemented to a set of predefined manufacturing processes of an industrial manufacturing scenario, comprising at least one processor configured to perform:

a) providing an initial version of a prediction unit, b) obtaining a set of unlabeled input data samples recorded at the supplemented manufacturing process, c) aggregating an embedding indicator indicating an association between the data samples of the supplemented manufacturing process by feeding the set of unlabeled input data samples into a context embedding unit, d) aggregating a value indicator for each data sample of the set of unlabeled input data samples by feeding the embedding indicator and the set of unlabeled input data samples into a value estimation unit, e) selecting a subset of data samples of the set of unlabelled input data samples depending on the value indicator and outputting a labelling request to a labelling unit, f) receiving labels for the subset of data samples in the labelling unit, g) training a current version of the prediction unit based on the labelled subset resulting in a trained version of the prediction unit, and h) outputting a monitoring result for the set of unlabeled input data samples by the trained version of the prediction unit indicating the quality of the supplemented manufacturing process to control manufacturing, wherein the context embedding unit is configured as a recurrent neural network aggregating the information of all the data samples in the set into a vector that encodes the supplemented manufacturing process.

2. The monitoring apparatus according to claim 1, comprising adapting the value estimation unit based on a validation loss indicator calculated by the trained version of the prediction unit when processed with at least one labelled validation data sample as input.

3. The monitoring apparatus according to claim 2, comprising adapting the context embedding unit based on the loss indicator and the adapted value estimation unit.

4. The monitoring apparatus according claim 1, wherein the context embedding unit and/or the value estimation unit are pre-trained based on at least one set of unlabeled training data samples of each of the predefined manufacturing processes as input.

5. The monitoring apparatus according to claim 4, wherein the pre-trained context embedding unit and the pre-trained value estimation unit are trained before applying to the supplemented manufacturing process by generating one value estimation unit and one context embedding unit, for each of the predefined manufacturing processes, iteratively i) training a prediction unit for each of the predefined manufacturing processes based on a set of unlabeled input data samples of the predefined manufacturing process according to steps a) to g), ii) optimizing the value estimator unit and the context embedding unit depending on a difference indicator based on a difference between the validation loss indicator determined by the current version of the prediction unit when processed with at least one validation data sample of the predetermined manufacturing process as input and a moving average of validation losses of previous versions of the prediction unit.

6. The monitoring apparatus according to claim 1, wherein optimizing of the value estimator unit and the context embedding unit is performed by stochastic gradient descent rule.

7. The monitoring apparatus according to claim 1, wherein the initial version of a prediction unit is a randomly initialized prediction unit or a pre-trained prediction unit.

8. The monitoring apparatus according to claim 1, wherein the labelling unit comprises a user interface to receive labels from a human user and/or comprises a machine-machine-interface to receive labels from a labelling machine.

9. The monitoring apparatus according to claim 1, wherein the manufacturing processes are milling processes and the data of the supplemented manufacturing process are sensor data representing the milling process.

10. The monitoring apparatus according to claim 9, wherein the sensor data representing the milling process are torques of the various axes in a milling machine, control deviations of the torque, or image data of the milled workpiece.

11. A computer-implemented method for quality monitoring of a supplemented manufacturing process, subsequently called supplemented manufacturing process, to a set of predefined manufacturing processes of industrial manufacturing scenario, comprising:

a) providing an initial version of a prediction unit, b) obtaining a set of unlabeled input data samples recorded at the supplemented manufacturing process, c) aggregating an embedding indicator indicating an association between the data samples of the supplemented manufacturing process by feeding the set of unlabeled input data samples into a context embedding unit, d) aggregating a value indicator for each data sample of the set of unlabeled input data samples by feeding the embedding indicator and the set of unlabeled input data samples into a value estimation unit, e) selecting a subset of data samples of the set of unlabeled input data samples depending on the value indicator and outputting a labelling request to a labelling unit, f) receiving labels for the subset of data samples in the labelling unit, g) training a current version of the prediction unit based on the labeled subset resulting in a trained version of the prediction unit, and h) outputting a monitoring result for the set of unlabeled input data samples by the trained version of the prediction unit indicating the quality of the supplemented manufacturing process to control manufacturing, wherein the context embedding unit is configured as a recurrent neural network aggregating the information of all the data samples in the set into a vector that encodes the manufacturing process.

12. A computer program product, comprising a computer readable hardware storage device having computer readable program code stored therein, said program code executable by a processor of a computer system to implement the method of claim 11 when said product is run on said digital computer.

13. An assistance system comprising at least one processor, configured as a context embedding unit and/or a value estimation unit which are trained before applying to a manufacturing process, subsequently called supplemented manufacturing process, supplemented to a set of predefined manufacturing process of an industrial manufacturing scenario, and to perform the steps of generating one value estimation unit and one context embedding unit, for each of the predefined manufacturing processes, iteratively i) training a prediction unit for each of the predefined manufacturing processes based on a set of unlabeled input data samples of the predefined manufacturing process according to steps a) to g) of claim 1, and ii) optimizing the value estimator unit and the context embedding unit depending on a difference indicator based on a difference between a validation loss indicator determined by a current version of the prediction unit when processed with at least one validation data sample of the predetermined manufacturing process as input and a moving average of validation losses of previous versions of the prediction unit.

* * * * *